April 4, 1944.  W. SHAVER  2,345,861
TABULAR COLUMN LEAF
Filed Jan. 30, 1943  2 Sheets-Sheet 1

Inventor
Ward Shaver,
Prevost & Prevost
Attorneys

Fig. 2

| | | Jan. | Feb. |
|---|---|---|---|
| District: | | | |
| Lease Name. | | | |
| Lease No. | | | |
| Company Intrest. | | | |
| Investment Additions - Net: | | | |
| Operating Expenses: | | 54321 | |
| 1 Labor | | 123456 | |
| 2 Transportation | | 654321 | |
| 3 Fuel, Water, Power | | 2900 | |
| 4 Conditioning Wells | | 25000 | |
| 5 Repairs, Supplies | | 2765 | |
| Direct Expenses - Gross | | | |
| 6 Insurance | | | |
| 7 Idle Time | | | |
| 8 Gross Production Taxes | | | |
| 9 Other Taxes | | | |
| 10 District Expense | | | |
| 12 Misc. | | | |
| 99 Joint Lessees' Portion | | | |
| Total Expense - Net | | | |
| Earnings: | | | |
| Oil Sales - Barrels | | | |
| Oil Sales - Value | | | |
| Gas Sales | | | |
| Misc. | | | |
| Total Earnings - Net | | | |
| Earnings (over/under) Expense | | | |
| Earnings (over/under) Expenditures | | | |
| Gross Production | | | |
| Skelly Net Production | | | |
| Gravity | | | |
| Total Expense - Net, per Barrel | | | |
| Partnership Interests: | | | |
| Pay Out Status | | | |

Inventor
Ward Shaver
Prevost & Prevost
Attorneys

Patented Apr. 4, 1944

2,345,861

UNITED STATES PATENT OFFICE 2,345,861

TABULAR COLUMN LEAF

Ward Shaver, Tulsa, Okla., assignor to Skelly Oil Company, Tulsa, Okla.

Application January 30, 1943, Serial No. 474,138

2 Claims. (Cl. 283—66)

This invention pertains to a tabular column file designed primarily for use in expediting and reducing the expenses attending the compilation of data relating to periodical cost and earnings of any project or business undertaking.

In many businesses it is important that the management be able to determine promptly and currently whether the venture is operating at a profit or loss, or will eventually result in a profit, and whether steps must be taken to reduce costs. Accounting and reporting systems heretofore in use have been inadequate to effectively accomplish that purpose.

This invention is particularly useful for making quickly and at low expense, and for keeping, a record of periodical costs or production or earnings figures relating to a project or operation when same are to be tabulated by periods, by products or otherwise.

This invention is also useful in inserting price changes in catalogues, especially those in multiple ring binders, to avoid the cost of frequently reprinting price list pages. In accordance with the invention, narrow strips showing new prices may be prepared and inserted on the page over the originally printed prices, at a comparatively small cost.

Illustrative of the advantage of time saved, and hence, expense saved, by the use of this invention over the conventional method of keeping separate monthly records of the cost per barrel of crude oil produced, for example, and the earnings from each of a number of different oil producing properties, showing a break-down of various costs, such as labor, material, fuel, rent, and earnings from oil sales, and the like, for each property, is as follows:

By the present conventional method, the various current monthly costs and earnings of a number of different oil properties, data concerning which have accumulated during the month, are compiled in columns on large sheets, in duplicate or triplicate, the columns on each such sheet containing such data relating to a number of different properties, by the accounting department of the property owner under separate lease names in vertical columns on the respective sheets, there being a printed list in the first or lefthand column of the different kinds of costs and earnings, and each such sheet, as stated above, contains columns, each of which relates to a different property, the identifying name of the property in each case being typed or written near the top of the column; and one copy of each such sheet is then supplied to a clerk in the office of the oil production superintendent for posting by said clerk to a separate production cost and earning record of each such separate property, in order to compile in one place the data, from month to month, relating to each individual property. Said posting operation requires a great deal of time, fourteen days in each month in the instance known to the applicant. But by this invention, the large sheets prepared as usual by the accounting department are cut with a paper cutter into strips, column wide, and thus the data relating to each property is segregated on a separate column or strip, and all of said strips are then supplied to the production department clerk, who, instead of laboriously posting the data thereon, simply inserts the strip relating to each property in a tabular column loose-leaf file on the sheet thereof relating to that property, and after the first such strip is inserted in said sheet, then, from month to month, a similar strip is placed therein by said clerk in the next succeeding column. It has been found that said clerk can do this as to all the properties involved, in the case of the strips for any particular month, in a very short time, two days as contrasted with fourteen days, in the instance known to the applicant. Thus it is to be seen that by the use of this invention, there is a high percentage of saving of both time and expense required to bring the record of each property up to date each calendar month. In addition thereto, the compiled information is made available to officers and others promptly and expeditiously. A further and important advantage of this invention is that it eliminates time consumed in proof reading the transcribed data, and it eliminates the possibility of error in the copying of the data. The columns or strips are detachable and replaceable; and a file sheet may be used over again if desired for the same or another property.

This invention is used in connection with the conventional prong, ring, or post type binder; the prongs, rings or posts may be spaced at any desirable distance best suited to the sheet or material to be inserted in the tabular column loose-leaf file.

The invention is illustrated in connection with the accompanying drawings, in which:

Fig. 2 is a fragmentary view of such sheet, with some of the tabular columns or strips attached thereto.

Fig. 3 is a sectional view, taken on the line 3—3 of Fig. 2.

Fig. 4 is a plan view of one of the strips detached from the sheet.

Figure 1:
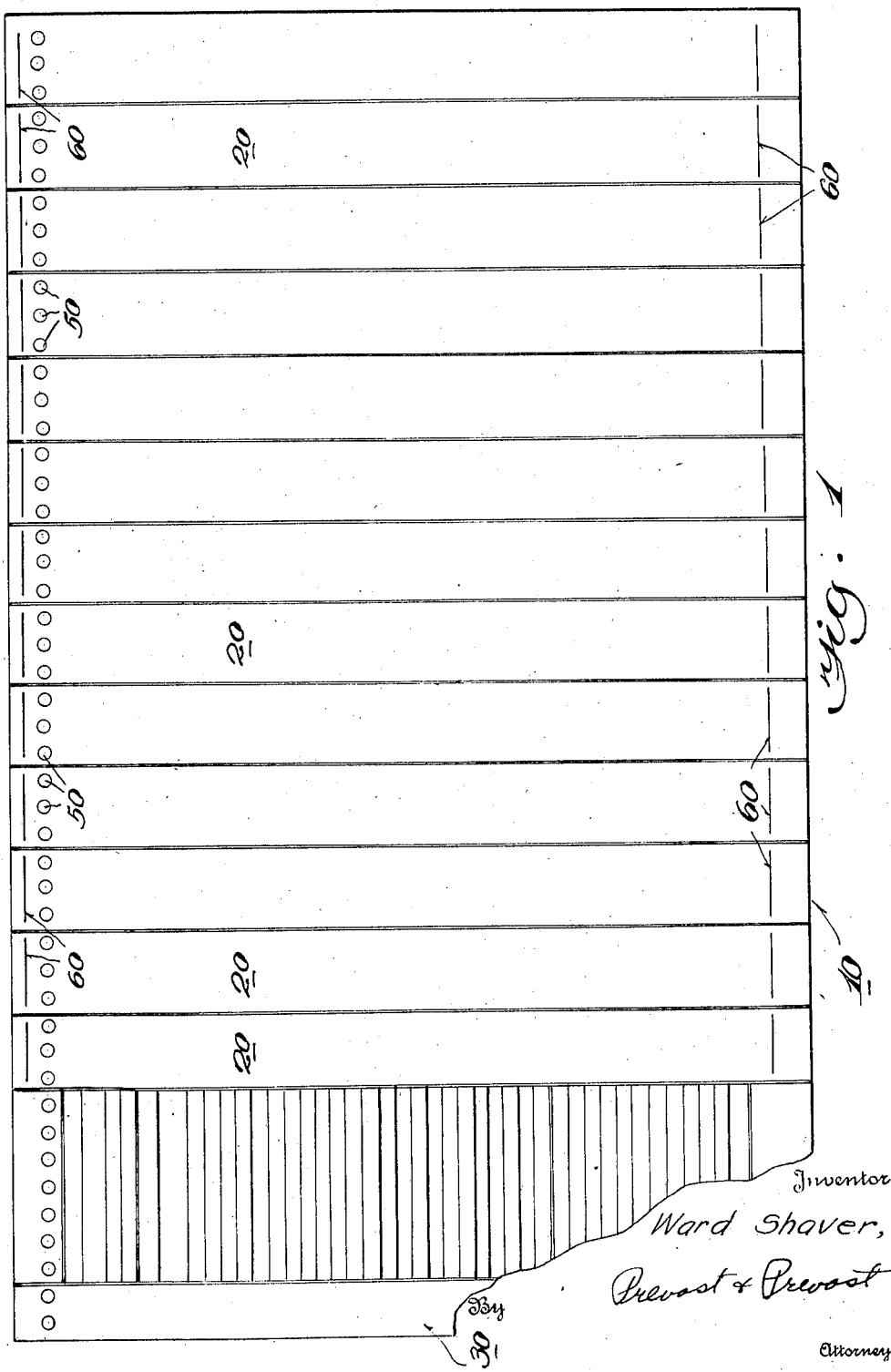
Fig. 1 is a plan view of one of the record sheets.

As an example of the tabular loose file, I may take an 11" x 17" record sheet 10 with a dozen 1⅛" vertical spaces and columns 20, one column for each calender month of the year, and a vertical space 30 at the left in which may be printed the same names 40 of the items of cost and income which are printed on the sheets used by the accountant who compiles the data relating to a number of properties on the columns thereof. This record sheet is punched "Visible record" style, that is, a row of holes 50 punched across the top or binding side to fit the prongs, rings or posts (not shown) of the binder to be used. Near the bottom of the sheet, centered with the columns, ¾" slits or cut-outs 60 are made, through which the angled or rounded corners 70 of the attached columns or strips 80 are to be inserted as they are put in place. It is understood that the above dimensions may be changed or varied in any way. The columns or strips 80 which are to be inserted are to be round hole punched near the top, as indicated at 90, to correspond with the respective holes 50 punched in the above described file sheet 10 so that the upper ends thereof may be inserted into the respective rings or over the respective prongs or posts of the binder. Also, the corners 70 of the lower ends of the strips are to be either angle cut or round cornered to an end size that will enable insertion thereof through the slits or cut-outs 60 in the bottom of the file sheets and yet to a size that when in full operation, will fit snugly in the slits or cut-outs. This latter is to prevent slipping or side sway and generally to hold them in a snug position as pages of the file are turned or as additional slips are inserted.

Where the column or strip inserts are to be kept in place in the file, more or less permanently, additional slits 60 are provided at the top of the sheet to receive the upper ends of the strips 80, or a spot of any suitable adhesive may be applied to hold each strip in place.

In cases where it is desirable to have a more secure fastening of the bottom ends of the columns or strips for rapid turning of the sheets of the file, and at the same time, to retain the easy removable feature, a one-half round, more or less, or an angle cut-out 100 may be placed in one or both side edges of the lower portion of the columns or strips, making the shortest distance from the center of the half round or angle to the opposite side of the column or strip, or to the center of the half round or angle on the opposite side, equal to the length of the slit or cut-out 60 in the file sheet, thus making a snug fit that can only be removed by buckling or swaying the sheet to one side.

It is believed that the invention may be readily understood from the foregoing description, taken in connection with the accompanying drawings, and it is evident that changes may be made in the details disclosed, without departing from the spirit of the invention, as expressed in the following claims.

What is claimed and desired to be secured by Letters Patent is:

1. In an article of the character described, a main sheet provided near one edge thereof with a permanent record column of the names of a multiplicity of items, said sheet having a series of holes adjacent another edge thereof which is perpendicular to the first mentioned edge, the sheet also being provided with a plurality of additional appropriately designated column spaces arranged side by side and in parallel relation to the permanent record column, the main sheet having slits therethrough arranged adjacent to an edge of the sheet that is parallel to the edge where the holes are arranged, strips associated with said column spaces and each having an end thereof extending through one of the slits, the opposite ends of the strips having holes registering with holes in the main sheet, each strip being adapted to receive data relating to the items one the record column of the main sheet.

2. In an article of the character described a main sheet provided near one side edge thereof with a permanent record column of the names of a multiplicity of items, said sheet having a series of holes adjacent its top edge, the sheet also being provided with a plurality of additional appropriately designated column spaces arranged side by side and in parallel relation to the permanent record column, the main sheet having slits therethrough arranged adjacent to the bottom edge of the sheet, strips associated with said column spaces and each having an end thereof extending through one of the slits, the opposite ends of the strips having holes registering with the holes in the main sheet, each strip being adapted to receive data relating to the items of the record column of the main sheet.

WARD SHAVER.